(12) United States Patent
Fujita

(10) Patent No.: US 6,584,646 B2
(45) Date of Patent: Jul. 1, 2003

(54) TILT HINGE FOR OFFICE AUTOMATION EQUIPMENT

(75) Inventor: Oriya Fujita, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 28 days.

(21) Appl. No.: 09/741,549

(22) Filed: Dec. 20, 2000

(65) Prior Publication Data

US 2001/0016969 A1 Aug. 30, 2001

(30) Foreign Application Priority Data

Feb. 29, 2000 (JP) ........................................ 2000-53065
Sep. 21, 2000 (JP) ....................................... 2000-286932

(51) Int. Cl.$^7$ ............................................. E05C 17/64
(52) U.S. Cl. ...................................................... 16/342
(58) Field of Search ........................ 16/297, 298, 322, 16/337, 338, 342, 341; 361/681, 682, 680; 403/119, 120; 379/433.13

(56) References Cited

U.S. PATENT DOCUMENTS

| | | | | |
|---|---|---|---|---|
| 645,218 A | * | 3/1900 | Roche | ........................ 16/338 |
| 5,598,607 A | * | 2/1997 | Katagiri | ........................ 16/337 |
| 5,632,066 A | * | 5/1997 | Huong | ........................ 16/338 |
| 5,896,622 A | * | 4/1999 | Lu | ............................... 16/337 |
| 5,950,281 A | * | 9/1999 | Lu | ............................... 16/342 |
| 6,170,120 B1 | * | 1/2001 | Lu | ............................... 16/342 |
| 6,230,365 B1 | * | 5/2001 | Lu | ............................... 16/337 |

FOREIGN PATENT DOCUMENTS

| | | | | |
|---|---|---|---|---|
| JP | 1047337 | | of 1996 | |
| JP | 10294572 A | * | 11/1998 | .......... H05K/05/03 |

* cited by examiner

Primary Examiner—Anthony Knight
Assistant Examiner—Doug Hutton
(74) Attorney, Agent, or Firm—Notaro & Michalos P.C.

(57) ABSTRACT

A tilt hinge for office equipment such as a compact personal computer, has a mounting plate and a bearing plate that is at right angles to the mounting plate. A torque generating part of a shaft is press fit into one part of an elastic fastening curl member. The curl part is at the tip of the bearing plate. Another torque part of the shaft is also press fit into a modified curl part of the curl member. The curl part is moved circumferentially by an adjustment screw so that torque generated by the torque generating part of the shaft can be adjusted and is stable. The modified engaging curl part also has a flat part pressed against a portion of the shaft on an inner surface of the curl member.

12 Claims, 13 Drawing Sheets

TILT HINGE FOR OFFICE AUTOMATION EQUIPMENT

BACKGROUND OF THE INVENTION

1. Field of the Invention

This invention concerns a curl type tilt hinge for office automation equipment, which is mounted between a keyboard unit and a display unit of an office automation equipment, in particular, a compact personal computer, etc. and is favorable for opening and closing the keyboard unit, which is a first member, and the display unit, which is a second member, in a relative manner and stopping and maintaining these members at an arbitrary opening angle.

2. Description of the Prior Art

As a prior art, a tilt hinge for office automation equipment is known with which a fastening curl part, having a fastening curl member, is formed on a bearing plate part of a mounted member to be mounted to the main device unit, which is a first member, such as a keyboard unit, and upon inserting a rotating shaft, which supports a display unit, which is a second member and serves as an opening and closing member, into the fastening curl part, the fastening curl member is moved towards the bearing plate side by means of a fastening screw to fasten the outer circumference of the rotating shaft and generate frictional torque.

Japanese Un-examined Patent Publication No. Hei-10-47337 also discloses such a curl type tilt hinge, which is comprised of a mounting member, having a curl part provided with elasticity, a shaft that is press fitted into the abovementioned curl part of the mounting member, and a bracket that is mounted to this shaft, and with which the cross-sectional shape of inner side of the curl part is made a circular shape that is matched as much as possible to the outer shape of the shaft.

With the former of the above-described prior-art tilt hinges, though the frictional torque that the fastening curl part creates by fastening the outer circumference of the rotating shaft can be adjusted in each product by means of the fastening screw, the frictional torque, though changing slightly with time, is substantially fixed and the frictional torque cannot be made to vary in the process of opening and closing the display unit.

The latter of the above-described prior art (Japanese Un-examined Patent Publication No. Hei-10-47337), is called a stage-less tilt hinge since the keyboard unit and the display unit, which are the first member and second member, respectively, that are opened and closed in a relative manner, can be stopped and maintained at an arbitrary opening position in a stage-less manner. However, as shown in FIGS. 12 and 13, since the shape of the hole part 20a of curl part 20 will not be completely the same in each part but will vary no matter how high the precision is made, the points (indicated by filled circles) at which the outer circumference of a shaft 21, which is press fitted into curl part 20, contacts the inner side of the hole part 20a of curl part 20 will differ with each part and since the spring characteristics of the curl part will thus vary, the rotational torque created by each tilt hinge will not be the same.

Also, since the gap between the inner side of curl part 20 and the outer circumference of shaft 21, which is press fitted into this curl part 20, will obviously be extremely minute, lubrication effects will not be exhibited effectively. Though a collar, having a plurality of small holes, grooves, or indented parts, is thus press fitted between shaft 21 and the inner side of curl part 20, the number of parts is made large and this has been an obstacle in lowering the manufacturing cost.

3. Object(s) of the Invention

An object of this invention is to provide a tilt hinge for office automation equipment, with which, by means of a simple arrangement, the frictional torque can be made to vary in the process of the opening and closing operation of a keyboard unit, which is a first member that serves as the main device unit, and a display unit, which is a second member.

Another object of this invention is to provide a tilt hinge, with which the dispersion of the rotational torque that is generated is made as small as possible and yet with which component parts are eliminated to make the manufacturing cost low.

In order to achieve the above objects, this invention provides a tilt hinge for office automation equipment, comprised of a mounting member, having a mounting plate part and a bearing plate part that is bent at a right angle with respect to the mounting plate part, an engaging curl part, which is provided with elasticity and is disposed at the tip of the abovementioned bearing plate part of the mounting member, and a shaft, having a torque generating part that is press fitted into the engaging curl part, a tilt hinge for office automation equipment characterized in that the abovementioned engaging curl part is comprised of a fastening curl part, having a fastening curl member, and a modified engaging curl part, having the axial center in common with the fastening curl part, the torque generating part of the abovementioned shaft is comprised of a main torque generating part, which is press fitted into the abovementioned fastening curl part, and a sub torque generating part, which is press fitted into the abovementioned modified engaging curl part, and the relative rotational torque between the abovementioned shaft and engaging curl part is adjusted by moving the fastening curl member of the abovementioned fastening curl part in the circumferential direction by means of an adjustment screw and thereby adjusting the fastening force applied to the main torque generating part.

With this arrangement by this invention, oil grooves or oil holes for lubricating oil may be provided on the outer circumference of the main torque generating part of the abovementioned shaft that is fastened by the abovementioned fastening curl part.

Furthermore with this invention, the bearing hole of the abovementioned engaging curl part may be made to have a D-like cross-sectional shape and the outer shape of the sub torque generating part of the rotating shaft that is press fitted into the bearing hole may likewise be made to have a D-like cross-sectional shape.

Also with this invention, an expanding slot may be provided between the fastening curl part and modified engaging curl part of the abovementioned mounting member and a flange part, provided on the abovementioned shaft, may be engaged with this expanding slot.

Also with this invention, a flat part, which is press contacted against a portion of the abovementioned shaft in the axial direction, may be provided on at least a part of the inner side of the abovementioned engaging curl part.

With the above arrangement by this invention, the abovementioned engaging curl part may be comprised of independent members and be fixed to a separately provided mounting member.

Furthermore with this invention, the abovementioned engaging curl part may be comprised of at least two engaging curl parts that are made opposite in the direction of engagement.

Furthermore with this invention, the abovementioned shaft may be a rotating shaft.

Furthermore with this invention, the abovementioned shaft may be fixed and the abovementioned mounting member may be arranged to rotate about the axis of this shaft.

Furthermore with this invention, one or more oil grooves or indented parts for keeping lubricating oil may be provided on the outer circumference of the abovementioned shaft.

Also with this invention, the engaging curl part may be comprised of both a fastening curl part, which has a fastening curl member, and a modified engaging curl part.

DESCRIPTION OF THE PREFERRED EMBODIMENTS

Figure 1:
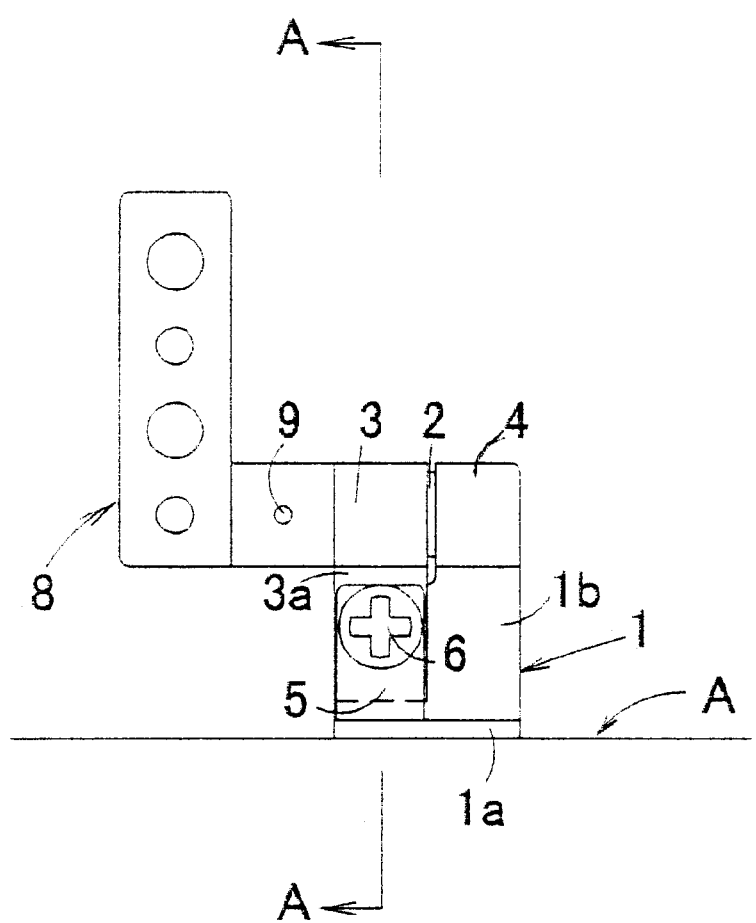
FIG. 1 is a front view of a tilt hinge for office automation equipment by this invention.
Figure 2:
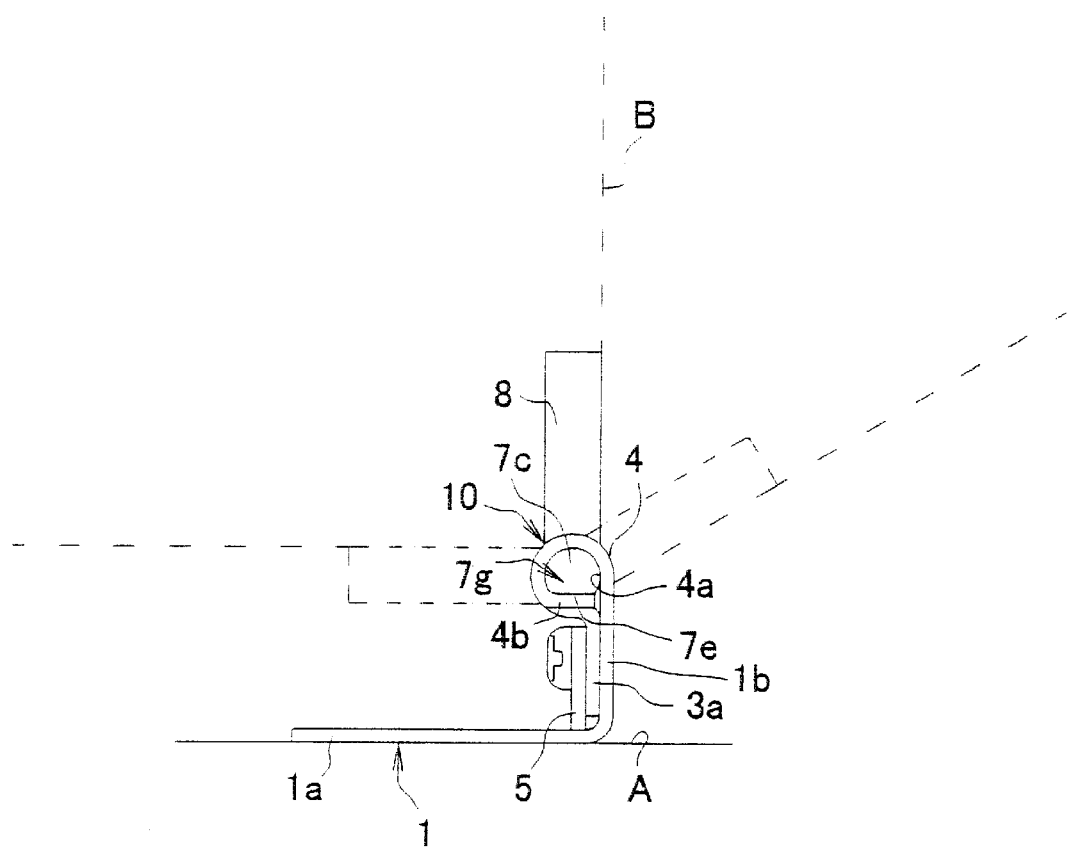
FIG. 2 is a right side view of the tilt hinge for office automation equipment by this invention.
Figure 3:
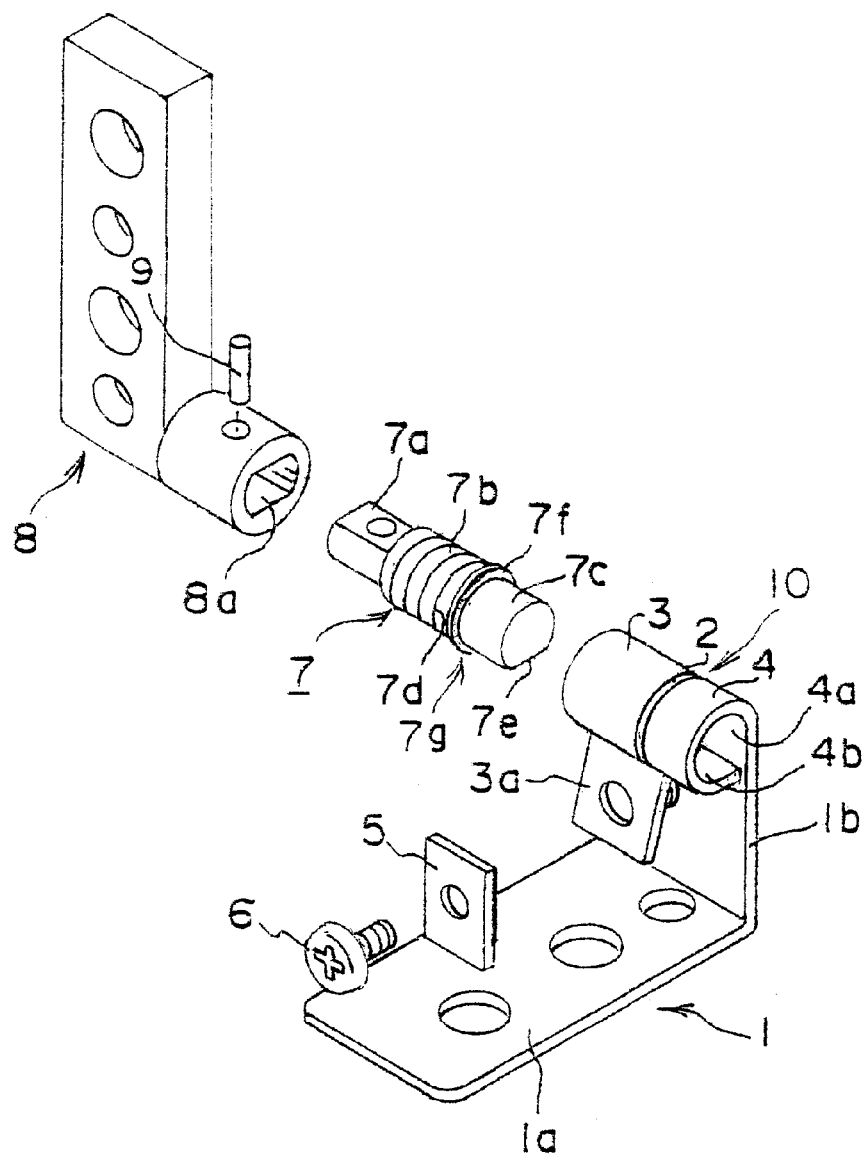
FIG. 3 is an exploded perspective view of the tilt hinge for office automation equipment by this invention.
Figure 4:
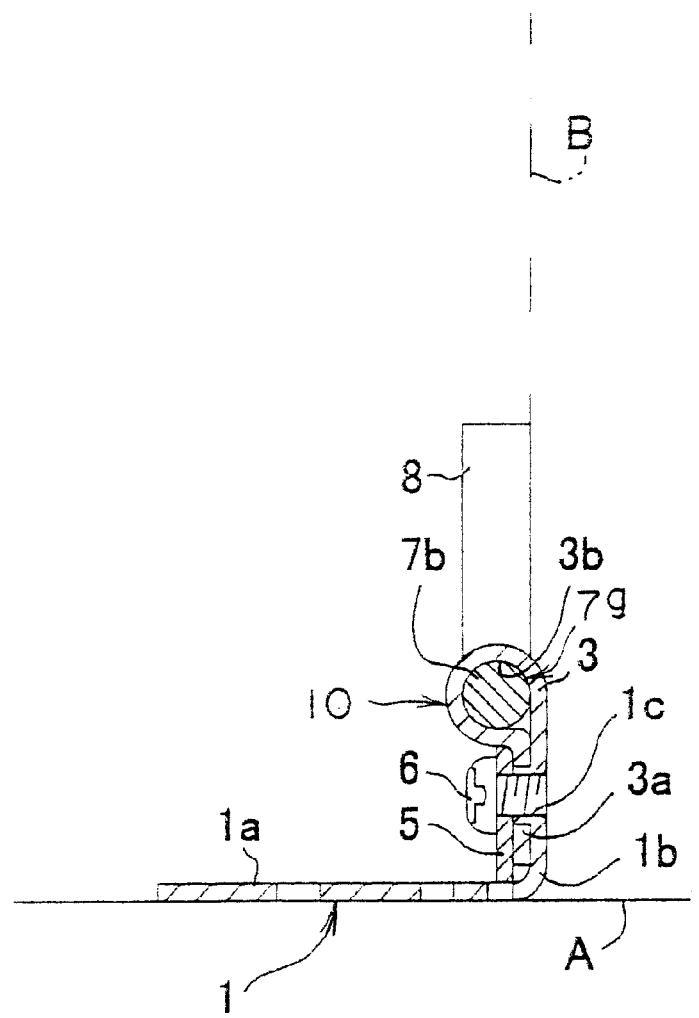
FIG. 4 is a sectional view along line A—A of FIG. 1.
Figure 5:
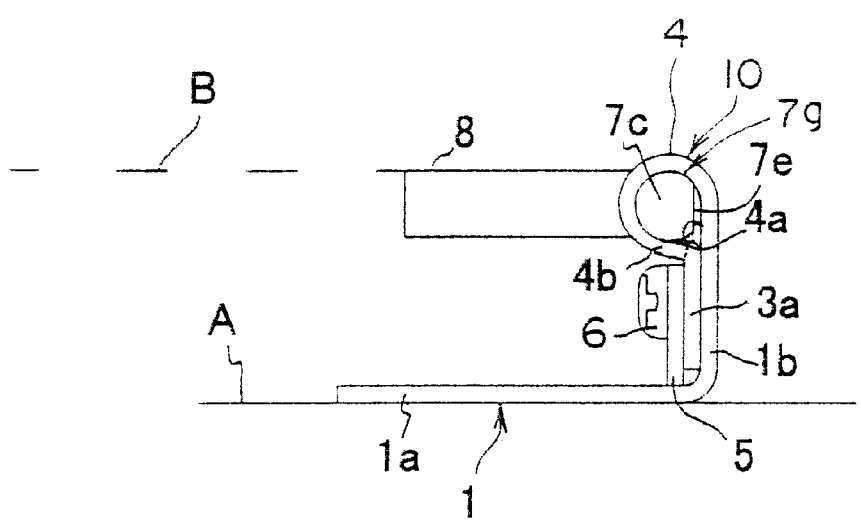
FIG. 5 is an explanatory diagram for explaining the operation of the tilt hinge for office automation equipment by this invention.
Figure 6:
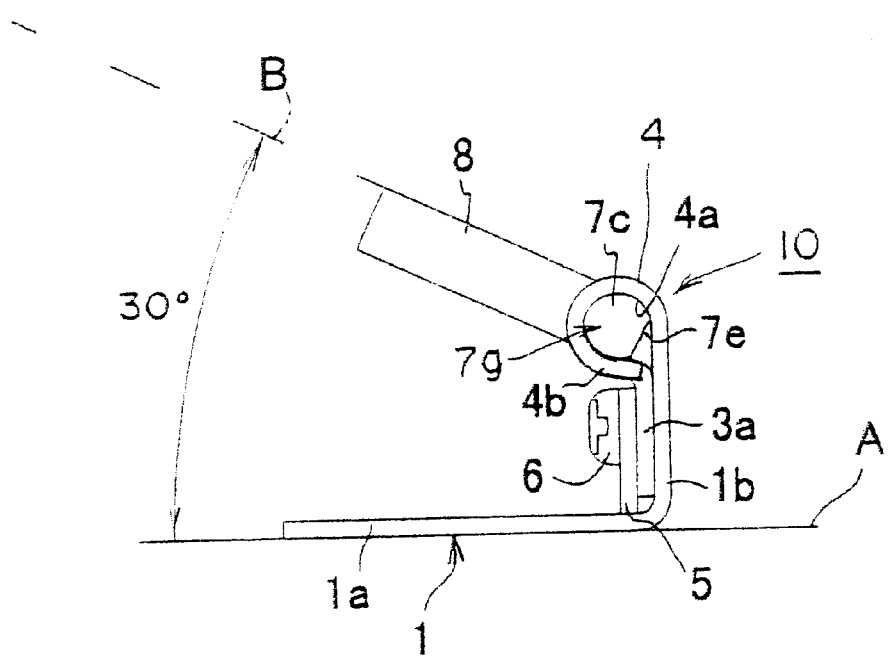
FIG. 6 is an explanatory diagram for explaining the operation of the tilt hinge for office automation equipment by this invention.
Figure 7:
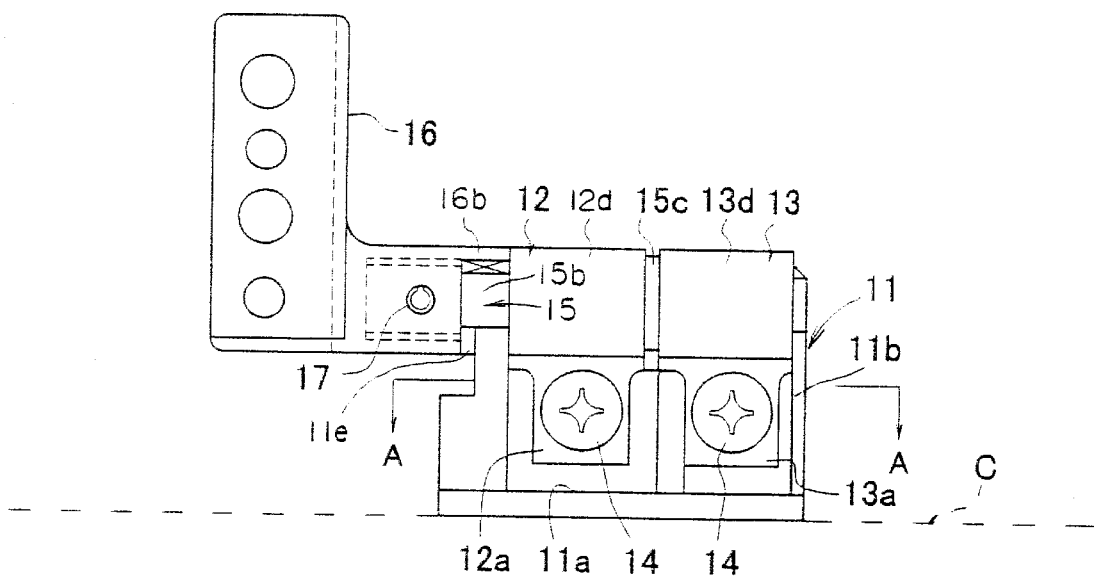
FIG. 7 is a front view, which shows another embodiment of a tilt hinge for office automation equipment by this invention.

The drawings show an embodiment of this invention, and in FIGS. 1 through 6, reference numeral 1 indicates a mounting member, comprised of a mounting plate part 1a, which is mounted to a keyboard unit A (first member), which functions as the main device unit of an office automation equipment, such as a compact personal computer, etc., and a bearing plate 1b, which is formed so as to bend upwards at a right angle with respect to the mounting plate part 1a. An engaging curl part 10 is provided at one side of bearing plate part 1b of mounting member 1. This engaging curl part 10 is partitioned by an expanding slot 2 and thereby provided with a fastening curl part 3, having a fastening curl member 3a, and a modified fastening part 4, with the axial center thereof being in common with the fastening curl part. SK-5 is used as the material for this mounting member 1 and elasticity is added by quenching and tempering. A fastening screw 6 is engaged via a washer 5 to fastening curl member 3a and this fastening screw 6 is screwed onto the female thread part 1c provided in bearing part 1b. The modified-bearing hole 4a of modified engaging curl part 4 is formed to have a substantially D-like cross-sectional shape having a flat part 4b in part.

Reference numeral 7 indicates a shaft. SCM415 is used as the material for this shaft 7 and carburization quenching is performed. A mounting part 7a of substantially rectangular cross-sectional shape is provided at one end part of shaft 7 and this mounting part 7a is inserted into a modified mounting hole 8a of substantially rectangular shape that is provided in a bracket 8, which is mounted to the display unit (opening/closing unit), that is, the second member, and fixed so as not to fall off by a fixing pin 9 that is passed through in the radial direction. This shaft 7 has, in continuation with the mounting part 7a, a torque generating part 7g, which is comprised of a main torque generating part 7b and a sub torque generating part 7c, and a flange part 7f is formed between main torque generating part 7b and sub torque generating part 7c. Main torque generating part 7b is press fitted into fastening curl part 3 and sub torque generating part 7c is press fitted into modified engaging curl part 4. Main torque generating part 7b is arranged so that by tightening the fastening screw 6 mounted to fastening curl member 3a of fastening curl part 3, the fastening curl member 3a will move towards the bearing plate part 1b side and the inner diameter of bearing hole 3b thereof will be narrowed, thereby generating the main frictional torque.

Grease or other lubricant is applied to the outer circumference of main torque generating part 7b and an oil groove 7d is provided so as to enable lubrication by this lubricant over a long period of time. An oil groove may be provided on the sub torque generating part as well, and the oil groove 7d may be a plurality of oil holes.

The shaft's sub torque generating part 7c, which is press fitted into modified bearing hole 4a of modified engaging curl part 4, has a substantially D-like cross-sectional shape that is matched with the D-like cross-sectional shape of modified bearing hole 4a of modified engaging curl part 4. The flange part 7f of shaft 7 engages with the expanding groove 2, provided between fastening curl part 3 and modified engaging curl part 4, to prevent the falling off of shaft 7 from fastening curl part 3 or modified engaging curl part 4 in the axial direction. The shape of sub torque generating part 7c and the cross-sectional shape of modified bearing hole 4a are not restricted to those of this embodiment.

The assembly of the tilt hinge by this invention is thus completed by mounting the mounting member 1 onto the keyboard unit A, which serves as the main device unit, that is, the first member of a compact office automation equipment, such as a compact personal computer, and mounting the mounting bracket 8 onto the display unit (opening/closing unit) B, which is the second member. And when display unit B is opened or closed with respect to keyboard unit A, shaft 7 is rotated via bracket 8, and in this process, the main frictional torque is generated as mentioned above at main torque generating part 7b of shaft 7, which is fastened by fastening curl part 3, to enable display unit B to be stopped and maintained with stability at an arbitrary opening angle.

In this process, since the flat part 7e of the sub torque generating part 7c of shaft 7, which has a D-like cross-sectional shape, generates a weak frictional torque in the opening angle range of 0° to 30° of display unit B due to the positional relationship with flat part 4b of modified bearing hole 4a, which likewise has a D-like cross-sectional shape, the total frictional torque of the frictional torques generated at main torque generating part 7b and sub torque generating part 7c is made to differ in the opening angle range of 0° to 30° of display unit B and the opening angle range of 30° or more. Thus with the embodiment, display unit B can be opened with relative ease and yet can be closed securely in the closing process.

FIGS. 7 through 11 show another embodiment of the tilt hinge for office automation equipment by this invention, and in these drawings, reference numeral 11 indicates a mounting member, which is mounted for example to the keyboard unit C, which is the first member and is the main device unit of an office automation equipment. The mounting member 11 of this embodiment is a die cast member and is comprised of a mounting plate part 11a and a bearing plate part 11b, which is raised perpendicularly from the end part of mounting plate part 11a. Mounting grooves 11c and 11d, which are shifted in position in the front/rear direction, are provided in the vertical direction of bearing plate part 11b. This mounting member 11 may also be mounted to the display unit D (opening/closing unit), which is the second member.

Engaging curl parts 12 and 13 have their fixing members 12a and 13a inserted into the mounting grooves 11c and 11d of bearing plate part lib of mounting member 11 and are fixed by mounting screws 14 to bearing plate part 11b. These engaging curl parts 12 and 13 are made opposite in the direction of engagement and the fixing members 12a and 13a are extended downwards at positions that are biased in mutually different directions with respect to the axial centers of the engaging curl parts 12 and 13, and the directions of mounting of fixing members 12a and 13a onto mounting grooves 11c and lid are differed so that the axial centers of the engaging curl parts 12 and 13 will be mutually matched.

With this embodiment, the die cast mounting member 11 may be eliminated, the engaging curl parts 12 and 13 may be made into a single integral body, and the fixing members may be extended and arranged to be fixed to the keyboard unit C, which is the first member. The positions at which the respective fixing members 12a and 13a extend downwards from modified engaging curl parts 12d and 13d may also be matched with the axial centers of modified engaging curl parts 12d and 13d.

The cross-sectional shapes of modified engaging curl parts 12d and 13d of the respective engaging curl parts 12 and 13 are not circular holes but flat parts 12b and 13b are formed at the front end sides of the engaging curl parts so as to form modified bearing holes 12c and 13c.

Reference numeral 15 indicates a shaft. This shaft is comprised of an axial part 15a of circular cross-sectional shape and a mounting part 15b of substantially rectangular shape. Mounting part 15b is inserted into the modified mounting hole 16a, with a substantially rectangular shape, of bracket 16, and these members are fixed together by a fixing pin 17 that passes through in the radial direction.

Figure 8:
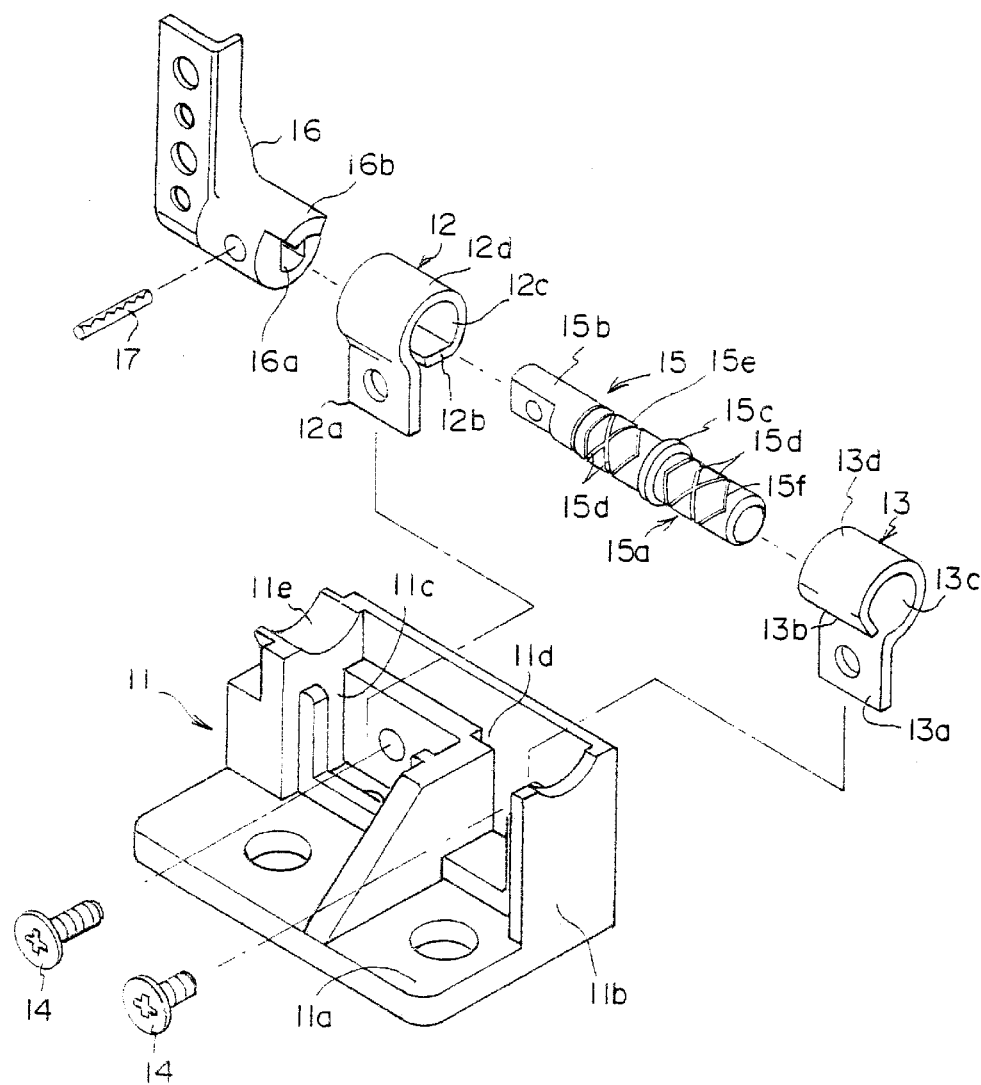
FIG. 8 is an exploded perspective view of the tilt hinge for office automation equipment shown in FIG. 7.
Figure 9:
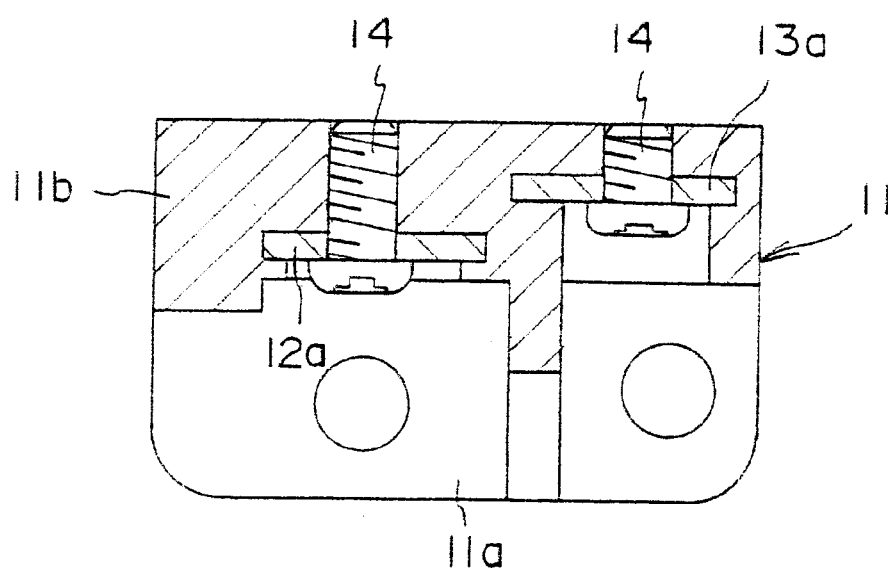
FIG. 9 is a sectional view along line A—A of FIG. 7.
Figure 10:
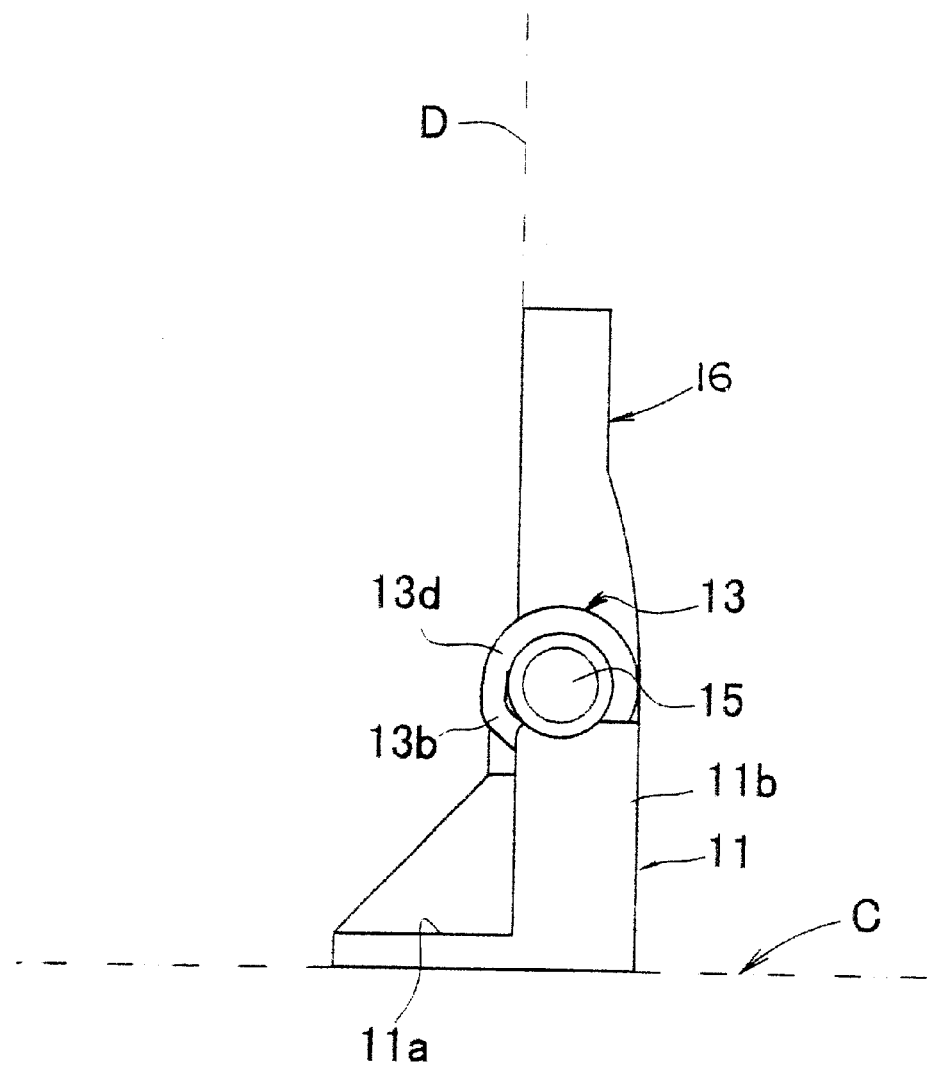
FIG. 10 is a right side view of the tilt hinge for office automation equipment shown in FIG. 7.

Especially as shown in FIG. 8, supporting portions 11f, 11f of the shaft 15 are formed on the top of the bearing plate part 11b of the mounting member 11 and part 11c and its extension 11e.

Shaft 15 has a flange part 15c provided at substantially the central part of the axial part 15a. Oil grooves 15d, comprised of inclining circular grooves, are provided so as to differ mutually in the directions of inclination on the left and right torque generating parts 15e and 15f that are partitioned by flange part 15c. The portions at which these oil grooves 15d are provided are press fitted into the modified bearing holes 12c and 13c of modified engaging curl parts 12d and 13d of the respective engaging curl parts 12 and 13. Oil grooves 15d are filled with an unillustrated lubricant, such as grease.

Bracket 16 has a stopper part 16b protruded from the edge part of the modified mounting hole 16a thereof and this stopper part 16b is arranged to come in contact with a stopper member 11e, provided on mounting member 11, at a certain rotation angle.

Figure 11:
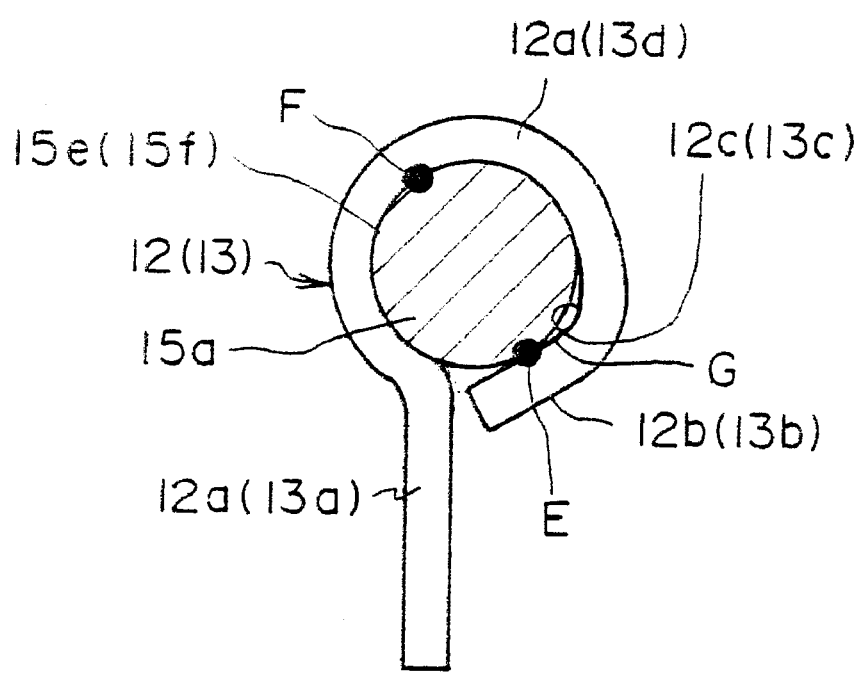
FIG. 11 is an explanatory diagram for explaining the principal parts of the tilt hinge for office automation equipment shown in FIGS. 7 to 10.
Figure 12:
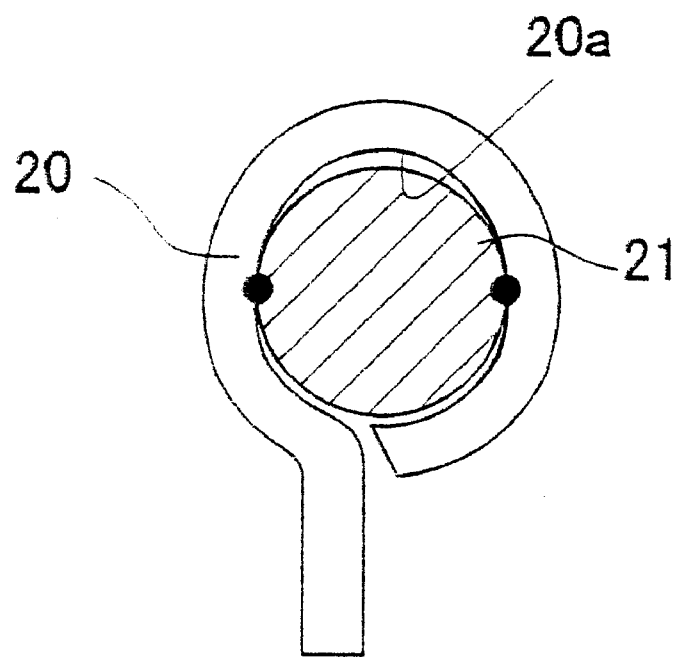
FIG. 12 is an explanatory diagram, which illustrates the problems of a prior art in somewhat exaggerated manner.
Figure 13:
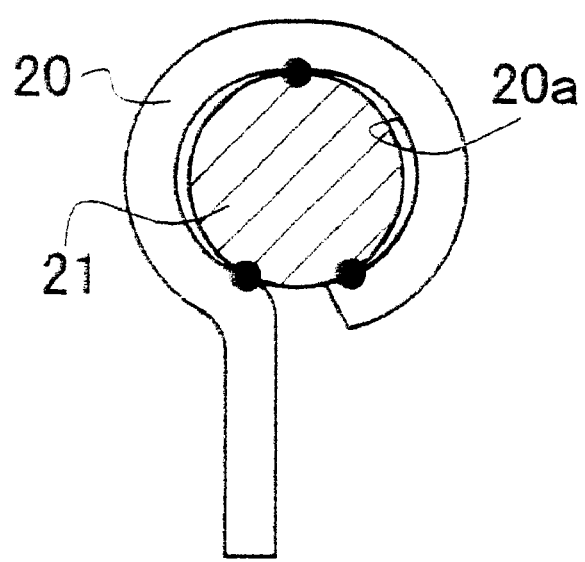
FIG. 13 is an explanatory diagram, which illustrates the problems of the prior art in somewhat exaggerated manner.

Thus as shown in FIG. 11, since the points at which the outer circumferences of torque generating parts 15e and 15f of axial part 15a of the press-fitted shaft 15 contact the modified bearing holes 12c and 13c of modified engaging curl parts 12d and 13d of engaging curl parts 12 and 13 are limited to the points E and the opposite surfaces F, the spring characteristics are stabilized and the spring constant is therefore limited to a low value. As a result, even when the modified engaging curl parts 12d and 13d of engaging curl parts 12 and 13 are not made strict in precision in comparison to the prior arts, a fixed frictional torque without dispersion can be created.

Also as shown likewise in FIG. 11, since gaps G are formed between the modified bearing holes 12c and 13c of the respective engaging curl parts 12 and 13 and the torque generating parts 15e and 15f of axial part 15a of shaft 15, oil basins for a lubricant are formed naturally at these gaps G, eliminating the necessity for using a collar as in the prior art.

Furthermore, further lubrication can be promoted by providing oil grooves 15d in the portions of torque generating parts 15e and 15f of axial part 15a as shown in FIG. 8. The shape and arrangement of the oil grooves 15d to be provided in the torque generating parts 15e and 15f of axial part 15a of shaft 15 are not limited to those of this embodiment and may be a plurality of indented parts.

For assembly of the tilt hinge by this invention, first the axial part 15a of shaft 15 is press fitted into modified bearing holes 12c and 13c of the modified engaging curl parts 12d and 13d of the respective engaging curl parts 12 and 13 until contact is made with flange part 15c from both sides of shaft 15 and the fixing members 12a and 13a of the respective engaging curl parts 12 and 13 are then inserted into the mounting grooves 11c and 11d and fixed to mounting member 11 by means of mounting screws 14. The mounting of bracket 16 onto shaft 15 may be performed before or after the mounting of engaging curl parts 12 and 13 onto mounting member 11. In the case where there are a plurality of engaging curl parts 12 and 13 that are made integral in their fixing parts, the flange part 15c of shaft 15 is eliminated and an E-ring is used.

The modified engaging curl part may be provided at just one side of the engaging curl part. Also, one of the engaging curl parts 12 and 13 of the second embodiment may be used as the fastening curl part of the first embodiment. Shafts 7 and 15 may be used as rotating shafts, and in such cases, the mounting member 1 or 11 and bracket 8 or 16 of the first or second embodiment rotate in a relative manner with shaft 7 or 11 as the pivot.

What is claimed is:

1. A tilt hinge for office automation equipment, comprising:

a mounting member, having a mounting plate part and a bearing plate part provided at a right angle with respect to the mounting plate part;

an engaging curl part provided with elasticity and disposed at a tip of said bearing plate part of the mounting member;

a shaft having a torque generating part press fitted into the engaging curl part; and a bracket mounted on the said shaft;

said engaging curl part is partitioned by an expanding slot, and thereby provided with a fastening curl part, having a fastening curl member and a bearing hole of a substantially circular cross-sectional shape through the fastening curl member, and a modified fastening part having a modified bearing hole of a substantially D-like cross-sectional shape with an axial center thereof being in common with the fastening curl part;

said fastening curl member engaged to said bearing plate part by a screw via non-rotational washer;

said torque generating part of said shaft comprising a main torque generating part, haying a substantially circular cross-sectional shape, press fitted into said fastening curl part; and, a sub torque generating part, having a substantially D-like cross-sectional shape, press fitted into said modified fastening part;

said fastening curl part generating a relative rotational torque between said main torque generating part and said engaging curl part being adjustable by moving the fastening curl member of said fastening curl part in a circumferential direction by means of said screw;

said modified fastening part generating a strong relative rotational torque in a predetermined rotation angle of said shaft between said sub torque generating part and said modified fastening part; and said bracket mounted on the shaft by inserting a mounting part to a modified mounting hole, and by passing through a fixing pin in a radial direction.

2. A tilt hinge for office automation equipment according to claim 1, wherein oil grooves or oil holes for lubricating oil are provided on the outer circumference of the main torque generating part of said shaft that is fastened by said fastening curl part.

3. A tilt hinge for office automation equipment according to claim 2, wherein a flange part on said shaft is engaged with the expanding slot.

4. A tilt hinge for office automation equipment according to claim 1, wherein a flange part of said shaft is engaged with the expanding slot.

5. A tilt hinge for office automation equipment, comprising a mounting member having a mounting plate part and a bearing plate part provided at a right angle with respect to the mounting plate part;

a pair of engaging curl parts provided with elasticity and disposed at the tip of said bearing plate part of the mounting member;

a shaft having torque generating parts each press fitted into the engaging curl parts;

a bracket mounted on said shaft;

said mounting plate part having a pair of mounting grooves which are shifted in position in the front/rear direction;

said engaging curl parts are comprised of a pair of fixing members and curl parts, wherein the curl parts are biased in mutually opposite directions with respect to the axial centers thereof and have a substantially D-shaped cross-sectional shape;

said fixing members inserted in said mounting grooves and fixed to said bearing plate part by mounting screws;

said torque generating parts of said shaft having a circular cross-sectional shape, so that said pair of curl parts only abut against said torque generating parts of said shaft at predetermined points.

6. A tilt hinge for office automation equipment according to claim 5, wherein one of the pair of curl parts is a fastening curl part.

7. A tilt hinge for office automation equipment according to claim 5, wherein said shaft is a rotating shaft.

8. A tilt hinge for office automation equipment according to claim 5, wherein one of the pair of engaging curl parts is a fastening curl part.

9. A tilt hinge for office automation equipment according to claim 5, wherein said shaft is fixed and said mounting member is arranged to rotate about the axis of the shaft.

10. A tilt hinge for office automation equipment according to claim 9, wherein one of the pair of engaging curl parts is a fastening curl part.

11. A tilt hinge for office automation equipment according to claim 5, wherein one or more oil grooves or indented parts for keeping lubricating oil is provided on the outer circumference of said shaft.

12. A tilt hinge for office automation equipment according to claim 11, wherein one of the pair of engaging curl parts is a fastening part.

* * * * *